Figure 1:
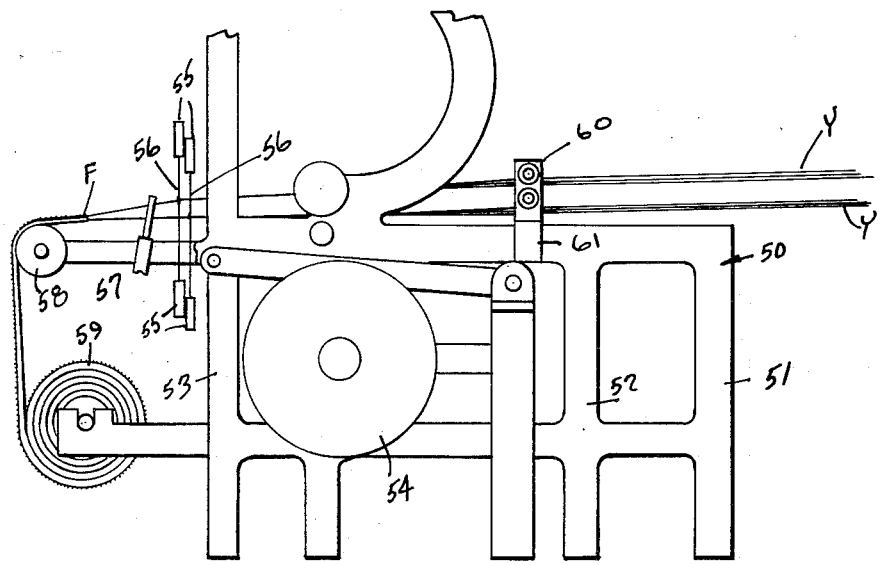

May 17, 1966   H. J. SMILEY ET AL   3,251,111
METHOD OF CONTROLLING THE TWIST IN PILE FABRICS TO IMPART
PATTERN EFFECTS THERETO
Filed Feb. 8, 1963   9 Sheets-Sheet 1

INVENTORS
HENRY F. NOWICKI
HARRY J. SMILEY

BY

May 17, 1966  H. J. SMILEY ET AL  3,251,111
METHOD OF CONTROLLING THE TWIST IN PILE FABRICS TO IMPART
PATTERN EFFECTS THERETO
Filed Feb. 8, 1963  9 Sheets-Sheet 2

INVENTORS
HENRY F. NOWICKI
HARRY J. SMILEY

BY  *Hyde C. Ballard*

May 17, 1966 H. J. SMILEY ET AL 3,251,111
METHOD OF CONTROLLING THE TWIST IN PILE FABRICS TO IMPART
PATTERN EFFECTS THERETO
Filed Feb. 8, 1963 9 Sheets-Sheet 3
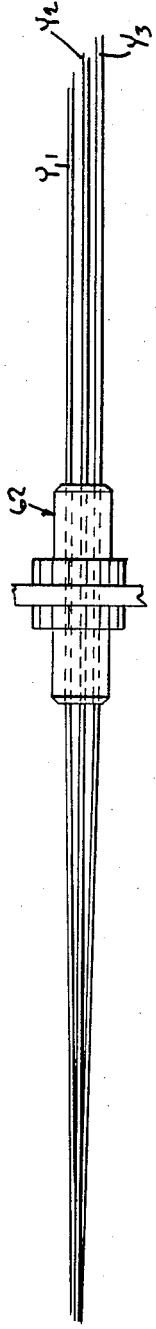
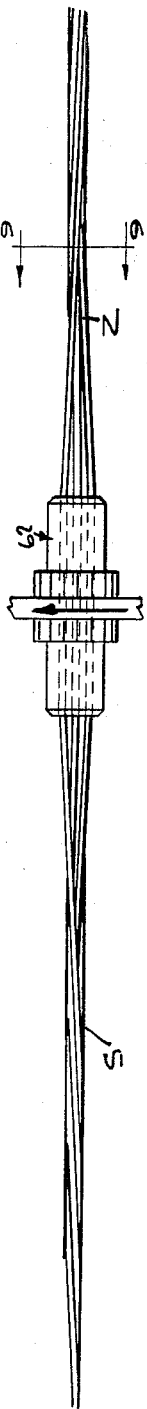
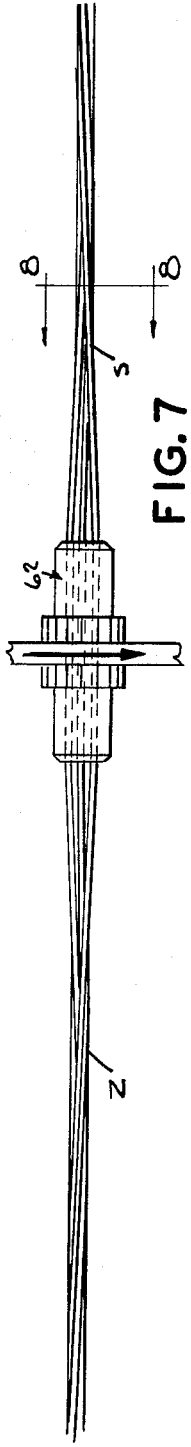
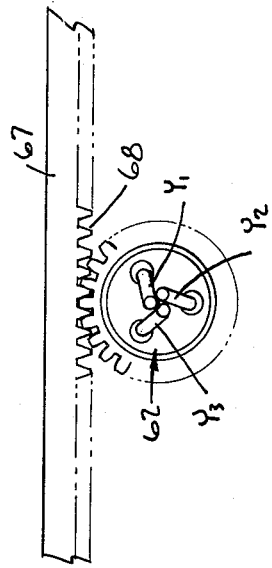
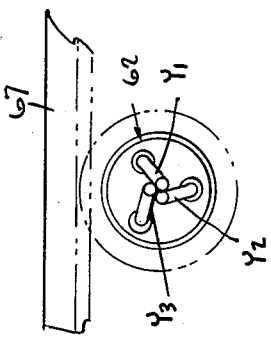
INVENTORS
HENRY F. NOWICKI
HARRY J. SMILEY
BY May 17, 1966   H. J. SMILEY ET AL   3,251,111
METHOD OF CONTROLLING THE TWIST IN PILE FABRICS TO IMPART
PATTERN EFFECTS THERETO
Filed Feb. 8, 1963   9 Sheets-Sheet 4

INVENTORS
HENRY F. NOWICKI
HARRY J. SMILEY

BY *Hyde W. Bollard*

INVENTORS
HENRY F. NOWICKI
HARRY J. SMILEY

May 17, 1966   H. J. SMILEY ET AL   3,251,111
METHOD OF CONTROLLING THE TWIST IN PILE FABRICS TO IMPART
PATTERN EFFECTS THERETO
Filed Feb. 8, 1963   9 Sheets-Sheet 6

INVENTORS
HENRY F. NOWICKI
HARRY J. SMILEY
BY

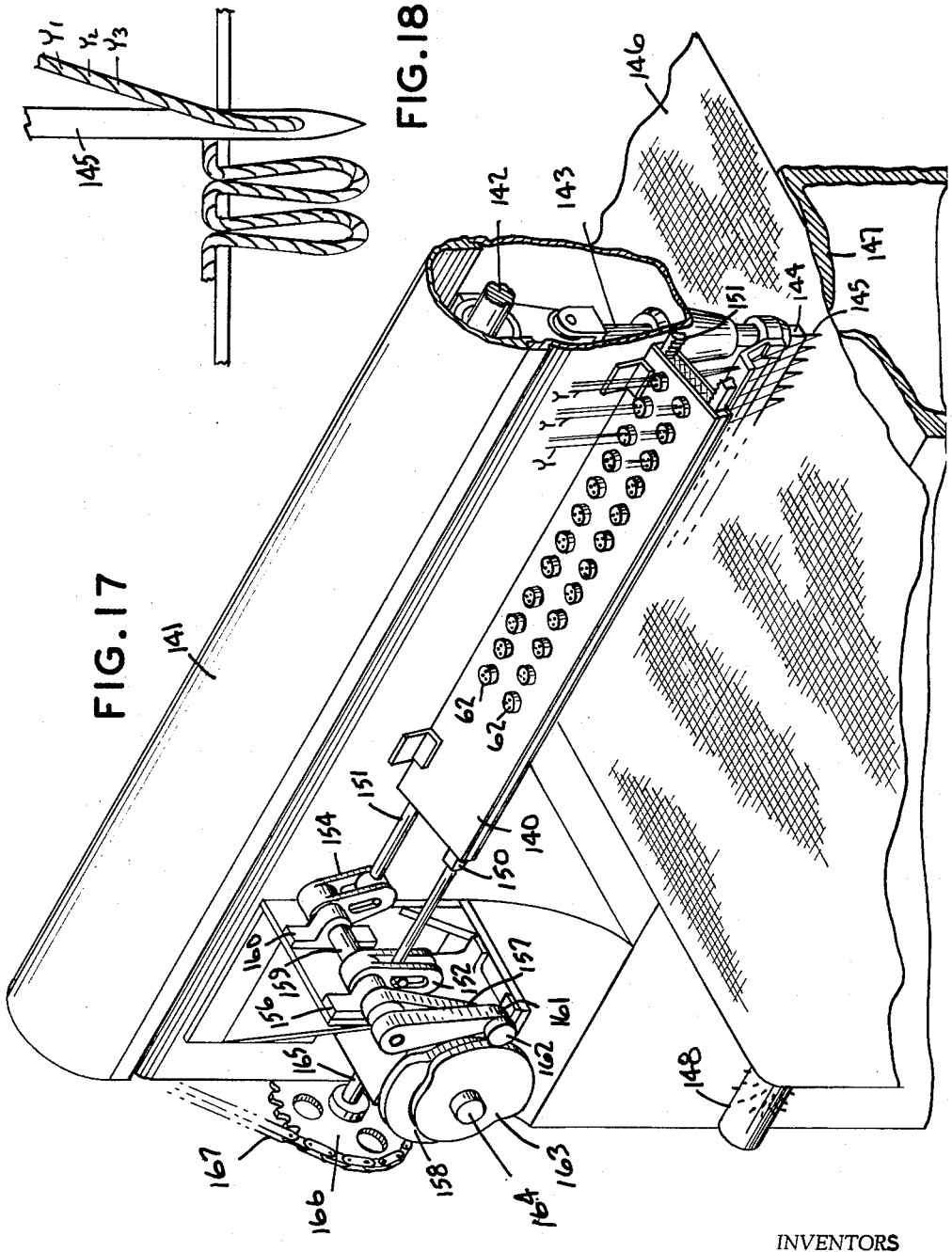
INVENTORS
HENRY F. NOWICKI
HARRY J. SMILEY
BY

May 17, 1966 H. J. SMILEY ET AL 3,251,111
METHOD OF CONTROLLING THE TWIST IN PILE FABRICS TO IMPART
PATTERN EFFECTS THERETO
Filed Feb. 8, 1963 9 Sheets-Sheet 9

INVENTORS
HENRY F. NOWICKI
HARRY J. SMILEY
BY

United States Patent Office 3,251,111
Patented May 17, 1966

3,251,111
METHOD OF CONTROLLING THE TWIST IN PILE FABRICS TO IMPART PATTERN EFFECTS THERETO
Harry J. Smiley, Glasgow, Va., and Henry F. Nowicki, Franklin Village, Norristown, Pa., assignors to James Lees and Sons Company, Bridgeport, Pa., a corporation of Delaware
Filed Feb. 8, 1963, Ser. No. 257,199
3 Claims. (Cl. 28—72)

This invention relates to textile fabrics and more particularly to an improved apparatus and method for producing a pile fabric suitable for soft floor covering. The invention also includes a novel fabric produced thereby.

The ability to achieve distinctive and original design effects with a loom or machine for producing soft floor coverings presents a constant and ever present challenge to the carpet designer and the weaver. Patterning in carpets has had various degrees of popularity and the term "patterning" as used herein includes effects produced by differential treatment of the pile yarns as well as enhanced effects due to differential coloring of certain of the yarn plies or yarn ends themselves.

To the best of our knowledge, never, since the invention of the machine-made carpet, has anyone been able to impart characteristic patterning effects to the yarn as it is being woven, tufted, or knitted. This naturally excludes the use of different types of pile wires and also the well-known jacquard and pattern attachments, etc. These devices pertain to the feeding of the yarn to provide differential height pile and, in the case of the jacquard, the differential height pile is frequently utilized to change the color of the face yarn in accordance with a predetermined pattern. In no case, however, was it possible to vary or control the appearance of the fabric in the loom or machine by regulating or varying the twist of the pile yarn ends while they were being fed to the fell of the fabric or to the needles of the pile fabricating machine. The twist in the pile yarn has from time immemorial been applied to the pile yarn ends by means of previous equipment such as a spinning frame or twister.

The present invention has for its primary object the provision of apparatus and method for superimposing an additional twist to the pile yarn ends in the loom immediately before the pile yarn ends feed through the heddles of a fabric loom.

A further object of the invention is to provide means for imparting a twist to groups of pile yarn ends immediately prior to the forming of pile by said yarn ends to thereby effect the pile patterning in the finished fabric.

A further object of the invention is to apply a superimposed twist to the pile yarn ends in a pile fabric loom.

A further object of the invention is to replace the conventional lease rods in a pile fabric loom with yarn twist controlling means.

A further object of the invention is to provide in a device of the type described, pattern means for imparting a predetermined superimposed twist to substantially all of the yarn ends in a pile fabric loom or tufting machine.

A still further object of the invention is to provide a novel method of producing a pile fabric which includes the steps of introducing a twist into the yarn and through the yarn controlling elements to effect a pattern in the finished pile.

A further object of the invention is to provide a method for controlling the twist of the pile yarn ends while feeding into a machine for producing pile fabric.

A further object of the invention is to provide an improved pile fabric having novel pattern effects in the pile yarns achieved by twist variations therein.

A further object of the invention is to provide a pile fabric in which groups of yarn ends are variably twisted together to periodically increase and decrease the relative twist of the ends in each group during the production of a pile fabric.

A further object of the invention is to provide a pile fabric in which groups of yarn ends are variably twisted together to periodically increase and decrease the relative twist of the ends in each group during the production of a pile fabric in accordance with simple harmonic motion.

Further objects will be apparent from the specification and drawings in which

Figure 4:
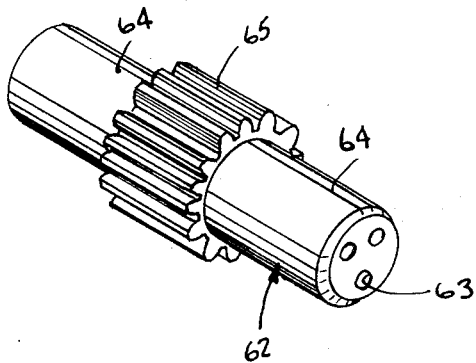
Figure 2:
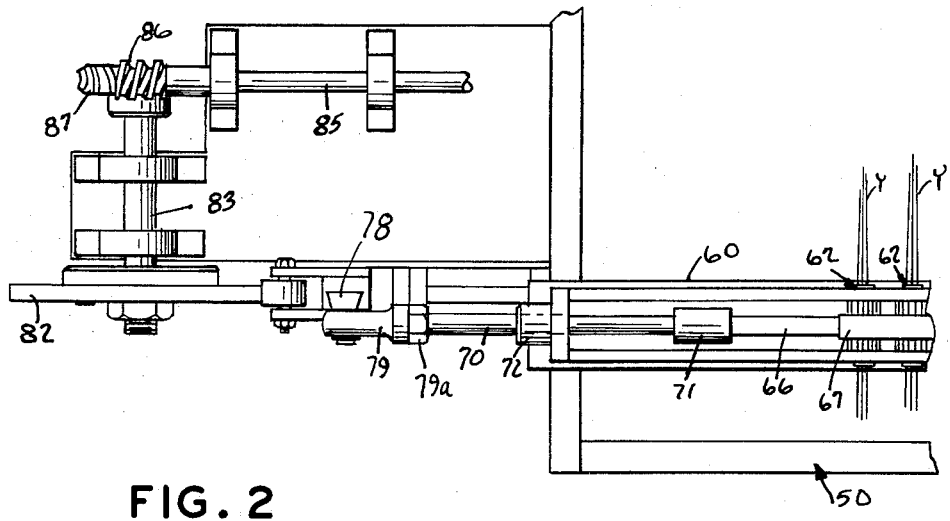
Figure 3:
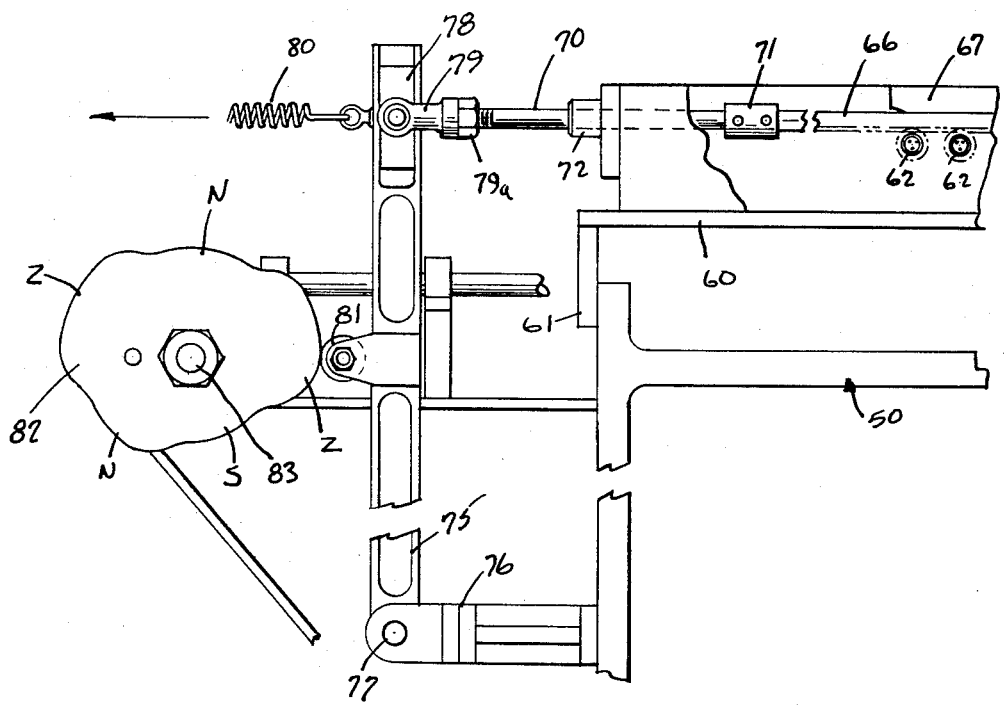
Figure 10:
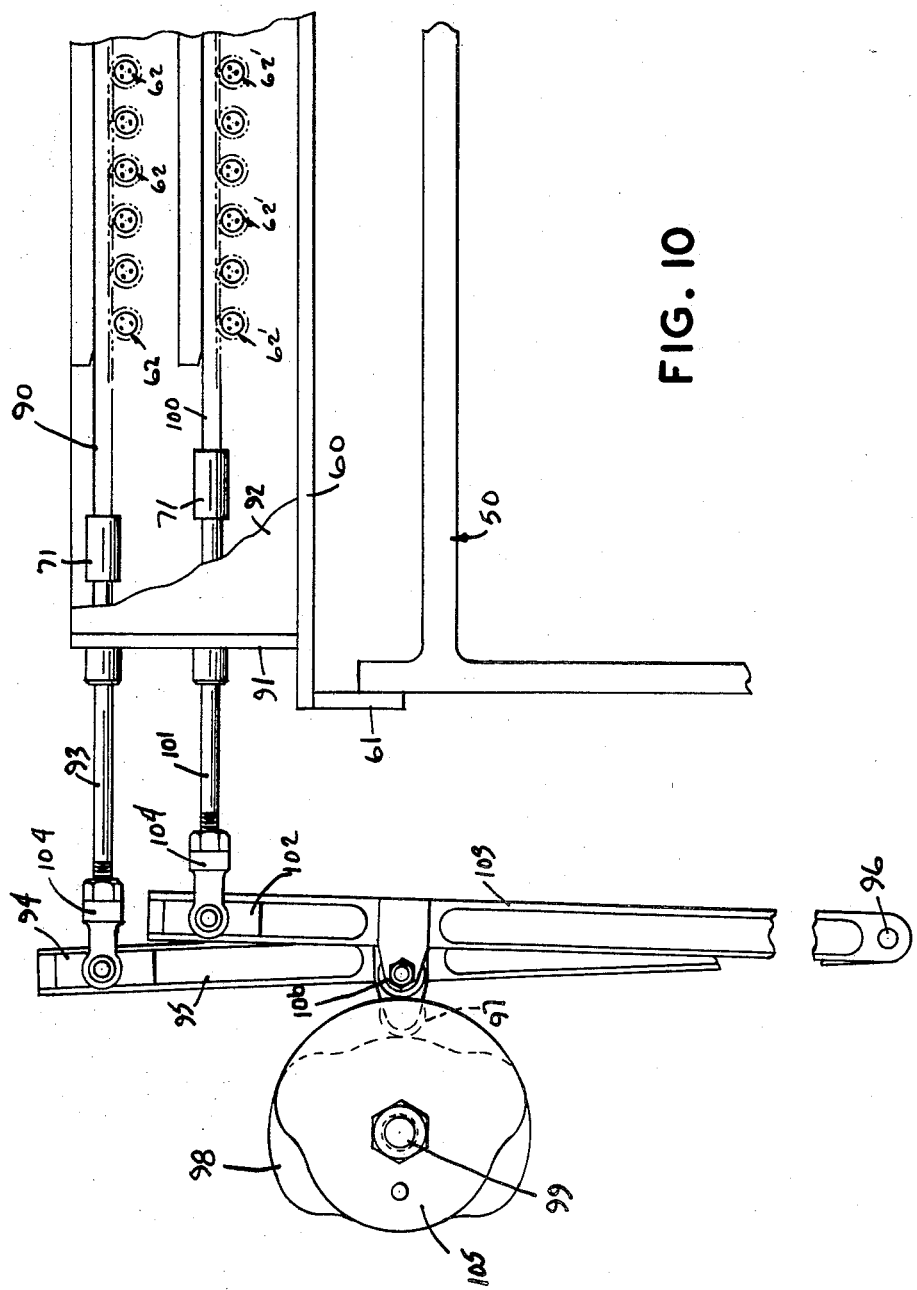
Figure 12:
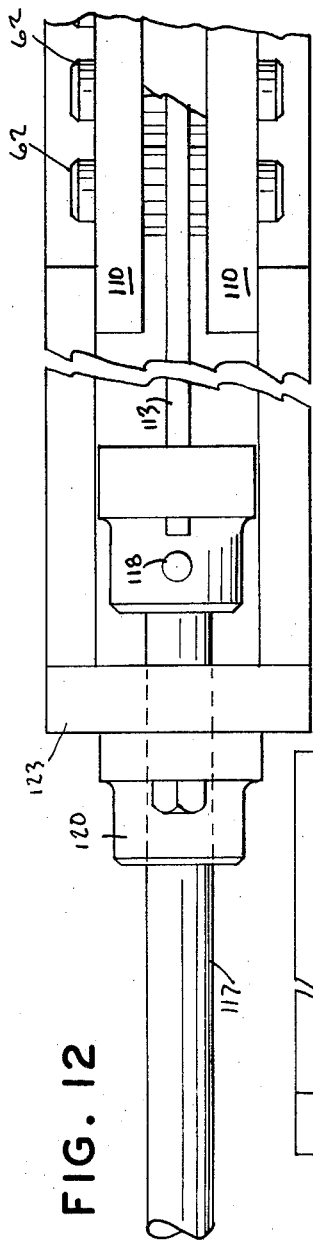
Figure 11:
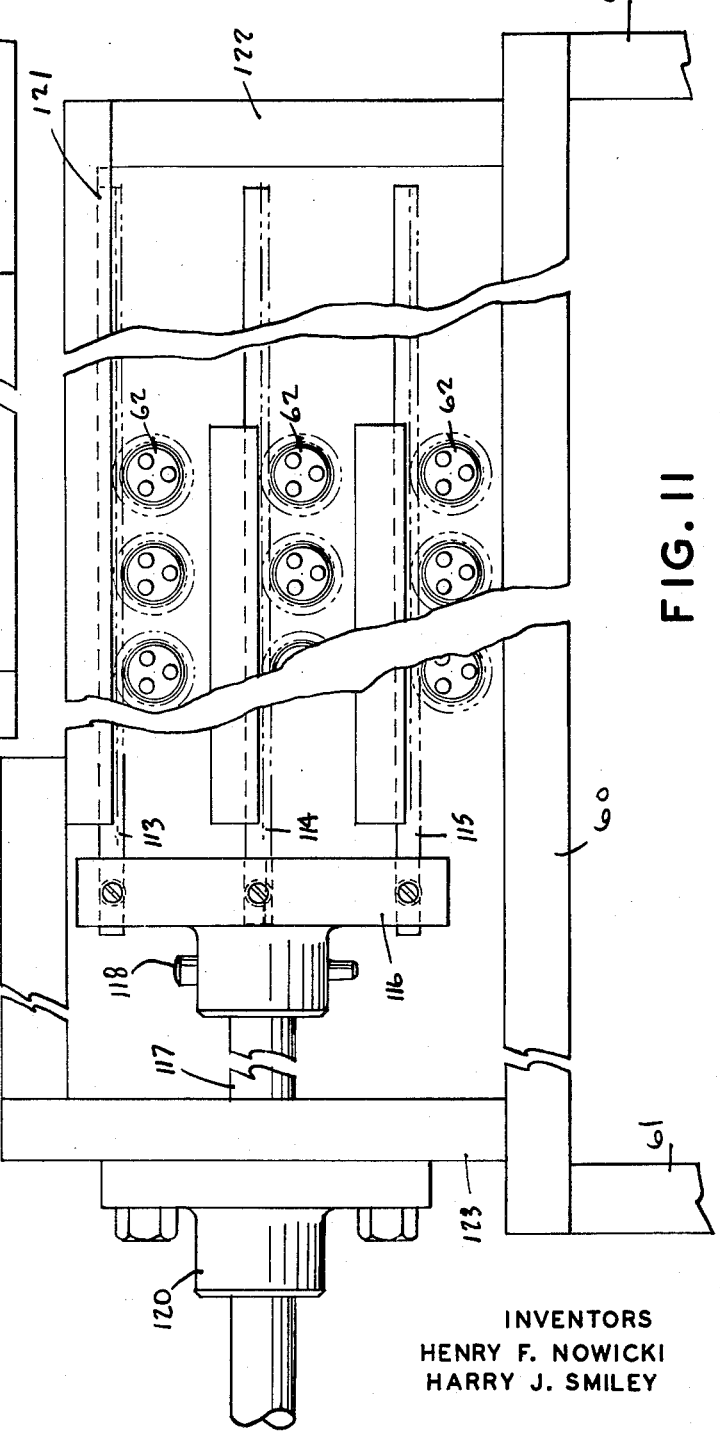
Figure 13:
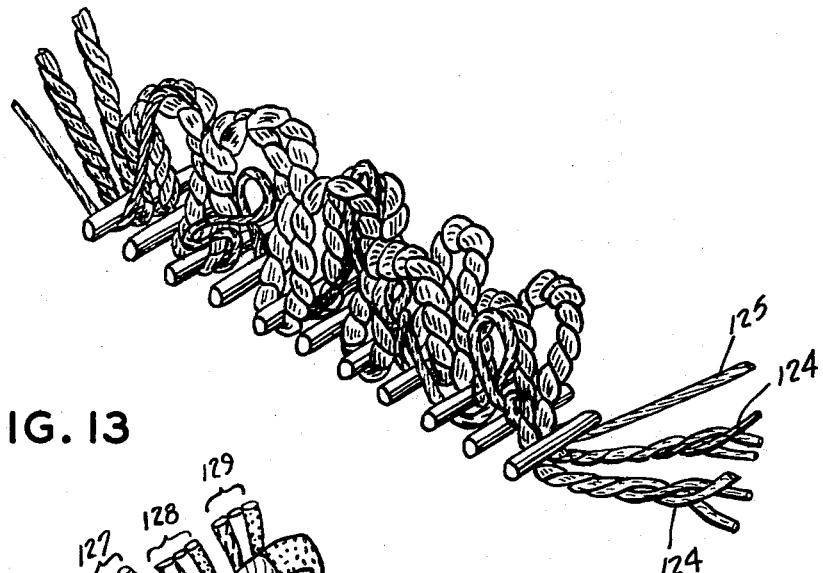
Figure 14:
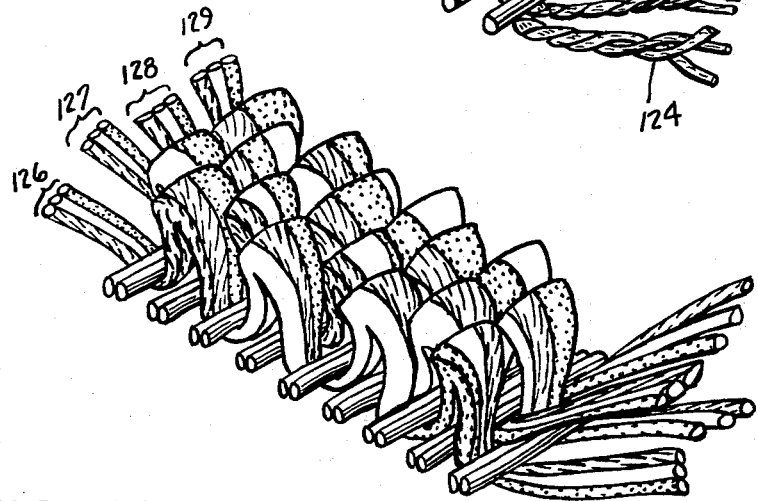
Figure 15:
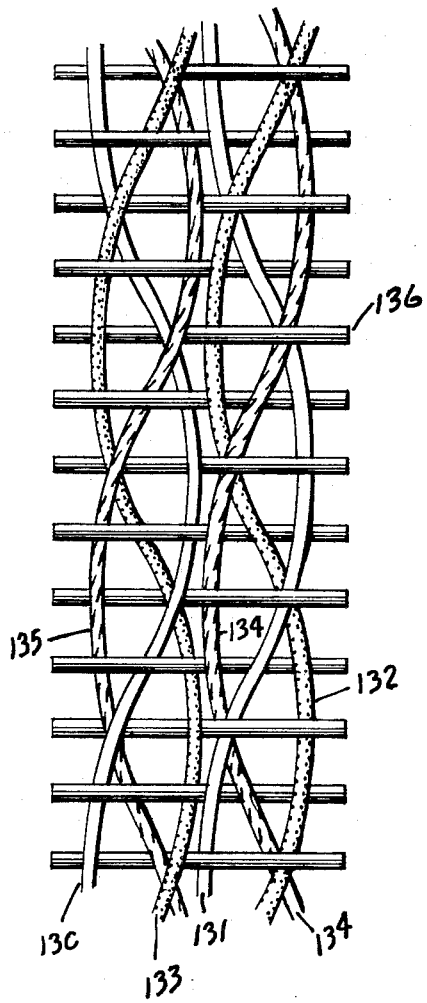
Figure 16:
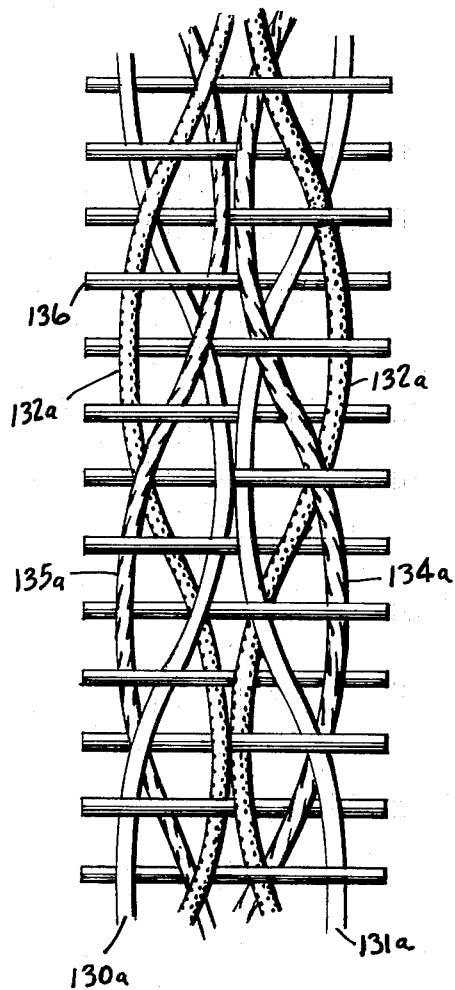
Figure 19:
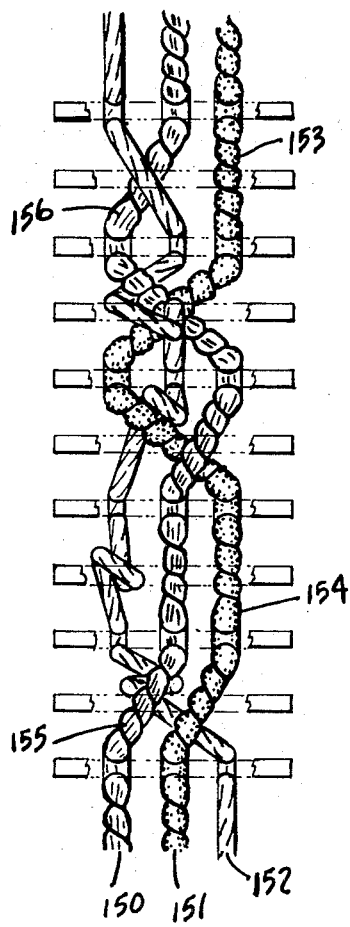
Figure 20:
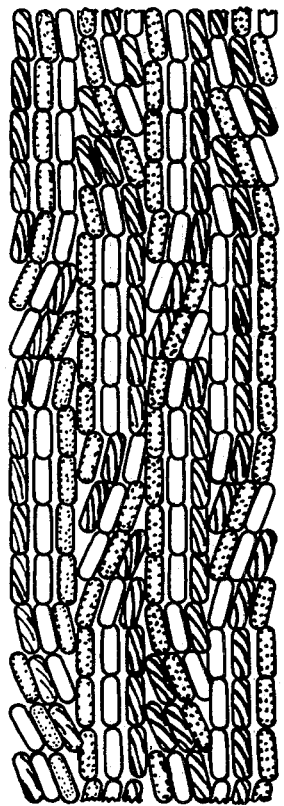

FIG. 1 is a schematic end view of a pile fabric loom incorporating the apparatus of the present invention, FIG. 2 is an enlarged detail showing a top view of the false twist imparting mechanism and the controlling means thereof, FIG. 3 is a side view of the structure of FIG. 2, FIG. 4 is a perspective showing one of the yarn controlling elements of FIGS. 2 and 3, FIG. 5 is an enlarged view of a single yarn controlling element with the yarn ends in a relatively neutral position, FIG. 6 shows the apparatus of FIG. 5 with the yarn controlling element turned in a direction to impart S twist, FIG. 7 is a view similar to FIG. 6 with the yarn controlling element turned in the opposite direction to impart a Z twist, FIG. 8 is a section as seen at 8—8 of FIG. 7, FIG. 9 is a section as seen at 9—9 of FIG. 6, FIG. 10 is a sectional detail of a modified form of the yarn controlling mechanism having dual pattern devices, FIG. 11 illustrates a further modification in which multiple yarn twisting elements are controlled alike as distinguished from the separately controlled elements of FIG. 10, FIG. 12 is a top view of the structure of FIG. 11, FIG. 13 is a perspective showing an improved fabric produced with the present invention, FIG. 14 is an enlarged top view of the fabric of FIG. 13, FIGS. 15 and 16 are schematic exploded views showing two 3 ply yarn ends made in accordance with the present invention in a woven fabric, FIG. 17 is a view of the twister as applied to a multi-needle tufting machine, FIG. 18 is an enlarged schematic view of one of the needles of the tufting machine of FIG. 17, FIG. 19 is an exploded schematic view showing the invention as applied to a tufted fabric, and FIG. 20 is a top view schematically showing the pattern effects of the invention in either a woven, knitted, or tufted fabric.

The invention comprises essentially the provision of a series of rotatable yarn guides positioned in a loom or other pile fabric forming machine such as a tufting machine or a knitting machine. The various pile ends are divided into groups, preferably three, and threaded through each of the rotatable elements at a point in the machine that is closely adjacent to the actual introduction and/or binding of the pile yarn into the fabric. The rotatable elements are turned as the pile yarn ends proceed through the machine, producing a superimposed twist on each set of three or more ends in such a way that the twist runs forward towards the fabric. As will be apparent hereinafter, the twist is maintained in each formed yarn end until the yarns are anchored into the fabric. Where the yarn ends are of varied color, very interesting effects can be achieved, but even with yarn ends of the same color, an enhanced twist and distribution of the yarn in the fabric can be accomplished.

Referring now to the drawings, FIGURE 1 illustrates a conventional loom for producing a pile fabric such as a carpet or rug. The loom is equipped with a framework indicated generally at 50 having a series of supporting legs 51, 52, and 53. A camshaft 54 for actuating the harness frames is journaled in frame 50 in accordance with customary practice. The yarn ends Y advance through the loom from a beam or creel (not shown) through the harness frames 55, 55 carrying the heddles 56. The reed 57 beats up the warp yarns into the fell F of the fabric which then passes over pin roll 58 and onto take up beam 59. At a convenient location between the yarn supply and the harness frames, we provide a bracket assembly 60 which is mounted on an adjustable standard 61 on each side of the loom. Bracket 60, in the form shown in FIGURES 2 and 3, journals a series of pinions 62, 62 having in the preferred form three smooth holes or bores 63 extending from end to end of the hub or shaft 64 of each pinion 62. The hub 64 is desirably formed of a frictionless material such as nylon or polytetrafluoroethylene. We prefer to provide three yarn guides 63 in each pinion 62. This number may be varied so long as a plurality of pile yarn ends are controlled by rotation of the pinion 62. Likewise the teeth 65 on the pinion may be formed integrally with the pinion shaft 64 or, if desired, these may be separately formed and nonrotatably secured thereto in accordance with the proper fabricating techniques for the materials employed. Rotation of the pinions 62 is controlled by means of a reciprocating rack 66 which oscillates back and forth in a guide 67, the bracket or bar 60. A plurality of teeth 68 (FIG. 9) on the rack 66 mesh with the teeth 65 on each pinion so that several turns of superimposed twist are imparted to each set of yarn ends Y through the guide passages 63 as the rack reciprocates. The twist is maintained in each formed yarn end until the yarns are anchored into the fabric. Control of the rack is provided by means of a connecting rod 70 secured to the rack by means of a coupling 71. The rod 70 is journaled in bracket 60 at 72. Rockerarm 75 is pivoted in a stationary bracket 76 at 77 and is provided with a sliding block 78 in its opposite end to which a balljoint element 79 is fastened. Joint 79 is adjustably secured to rod 70 by means of locknut 79a. Rockerarm 75 may desirably be spring loaded at 80 to maintain contact between a cam follower 81, arm 75, and a multi-lobe cam 82 mounted on shaft 83. As the camshaft 83 and cam 82 rotate, it will be seen that the arm 75 rocks back and forth on pivot 77, which in turn oscillates rack 66 through the connecting rod 70. Camshaft 83 is driven from any suitable driving shaft 85 on the loom through a worm 86 and worm wheel 87.

Referring to FIGURES 5–9, when the groups of yarn ends Y1, Y2, and Y3 are controlled by the individual pinions 62, the superimposed twist varies from zero (shown in FIGURE 5) to any desired number of turns, either S or Z. Opposite twist is imparted to the yarn ends Y1, Y2, and Y3 on either side of the pinion shaft 62. FIGURE 6 shows several turns of Z twist and FIGURE 7 shows an equal number of turns of S twist.

Referring to the cam 82 in FIGURE 3, the pinions are set at zero twist when the cam is in position at N, N whereas Z turns are imparted to the yarns when cam follower 81 is on cam lobe Z, Z and the S turns of twist are imparted when cam follower 81 is on the cam portion marked S. The twisting of the yarns as they feed through the pinions 62 may be seen clearly in FIGURES 8 and 9. FIGURE 9 shows Z twist and FIGURE 8 shows S twist.

The twist imparting mechanism described in connection with FIGURES 2 and 3 is controlled by a single cam 82. Where it is desired to form design effects in the fabric by imparting different twist to different selected groups of yarn ends at the same time we use multiple cams to control a plurality of banks of racks as may be seen in FIGURE 10. In this case, the upper rack 90 is slidably supported in a framework 91 and engages a plurality of pinion twisting elements 62, 62 journaled in the side plate 92 of the framework. The connecting rod 93 for the rack 90 is adjustably secured to a sliding block 94 in rockerarm 95 which is journaled at 96. A cam follower 97 secured to rockerarm 95 is controlled by a cam 98 secured to camshaft 99. The slope of cam 98 may be generated to give any desired timed reciprocal motion to rack 90. Approximately half of the yarn ends in the device of FIGURE 10 are threaded through other pinions 62', 62' which are rotated by rack 100, also slidably journaled in the bracket assembly 91. A connecting rod 101 secures rack 100 to a sliding block 102, rockerarm 103 by means of an adjustable clevis 104. The rotation of pinions 62', 62' controlled by rack 100 is produced by means of a cam 105 also keyed to camshaft 99 and contacting a cam follower 106 on the rockerarm 103. This design permits completely independent timing and functioning of a series of the pinions 62, 62 and the contour of the cams 98 and 105 can be controlled so that almost any desired effect within the scope of twisting the yarn ends is achieved.

In larger looms, tufting machines, or knitting machines, where the number of pile yarn ends are on the order of several hundred or even thousand, it may be preferred to substitute a plurality of racks for single banks of individually controlled racks 90 and 100 of FIGURE 10. Referring to FIGURE 11, we utilize triple banks of pinions 62, 62 which are journaled in side plates 110 (FIG. 12), each one being under the control of racks 113, 114, and 115. The racks comprise an oscillating framework tied together at each end by means of cross-arms 116, one of which is pinned to a cross-head by means of a taper pin 118. The cross-head 117, slidably supported in a sleeve bearing 120 in the rack assembly, is held in upright position by means of a grooved frame member 121 which is, in turn, mounted in the upright members 122 and 123. In other respects, the cross-head 117 is oscillated by means of suitable cam or other pattern controlling devices which may be mechanical, electrical, or hydraulic.

FIGURES 13–16 illustrate schematically various effects that can be achieved by means of the invention described herein. In FIGURE 13 two ends 124, 124 of the three ply yarn and one end 125 of single ply yarn are threaded through one of the pinions 62. The resultant effect due to the superimposed twist is clearly illustrated. It is possible in this way to produce a more homogeneous or overall random effect in the entire fabric. Although all or groups of the various ends have the same superimposed twist across the fabric, they tend to assume entirely different positions when woven. It will be noted in FIGURE 13 that the twist in the plied ends 124, 124 is substantially the same, however, the position of end 125 changes from side to side of the ends 124, 124 during the progress of the weaving operation. Nevertheless, at any point across the fabric, the effect of the superimposed twist is always the same. In FIGURE 14 a fragmentary section of a piece of woven fabric is illustrated in which four ends 126, 127, 128, and 129 of three ply yarn are used, but the ends in each ply have different colors or some other different characteristics. The different color is alternately concealed and emphasized in each of the ends so that a moresque or mottled effect is achieved and the diagonal striations which may occur in limited areas due to the presence of similarly colored plies in various yarn ends creates a most unusual effect and in some cases defies the observer to determine how the fabric was woven. As indicated above, if all of the yarn ends in the fabric are controlled with a single set of pinions as shown in FIGURE 2, then the superimposed twist characteristic, weftwise or transversely of the fabric, is the same for each group (in the present case 3) of yarn ends. In the event that the device of FIGURE 10 is used, then it is possible to produce opposite superimposed twist characteristics for alternate or any other number of ends across the fabric. In either case, it is an important feature of the invention that it is possible to create in a fabric an added twist which varies warpwise but is uniform weftwise for all ends controlled by a single rack.

The above characteristic is illustrated in FIGURES 15 and 16. The former shows six ends which are split into two sets of three ends apiece thus ilustrating the action of two adjacent pinions controlled by the same rack. In this case, the six yarn ends are shown as both having Z twist. In FIGURE 16 the same ends are illustrated but, although adjacent in the fabric, they are controlled by pinions turning in opposite directions such as shown in FIGURE 10, one set of three ends having Z twist and the other set having S twist. In FIGURE 15 plies 130 and 131 are of the same color or characteristic, plies 132 and 133 are the same as each other and also plies 134 and 135. It will be observed that the plies having the same characteristic, although in different ends, undulate in phase both in a Z direction. FIGURE 16 shows the undulations of yarn plies where they are 180° out of phase. This shows the plies 130a and 131a coming together near the center of the figure and at a maximum distance apart at the top and bottom of the figure. The same phase undulations occur with regard to the plies 132a–135a. It will be understood that the fabrics shown in FIGURES 13–16 are illustrative of the invention in a woven fabric but the same results can be produced in a tufted fabric, in which case the pile yarn ends will not appear to weave under the various filling or weft shots 136, 136.

As applied to a conventional tufting machine, our improved twister comprises a framework 140 (FIG. 17) on which is mounted an upper housing 141 enclosing the crankshaft 142 and vertical rods 143 from which the needle bar 144 is suspended. The needle bar 144 carries a plurality of needles 145 which penetrate a backing fabric 146 as it is fed over the throat 147 of the tufting machine by means of a driven pin roll 148. The yarns forming the tufted fabric or carpet are preferably grouped in units of three as shown in FIGURE 17 and each group of these yarns is feed through one of the needles 145. The twist, and in this case a ply twist, is imparted to the yarns Y1, Y2, and Y3 by means of pinions 62, 62 journaled in the housing 146. Each pinion is controlled by its appropriate rack 150 and 151 driven respectively from oscillating cranks 152 and 154. Crank 152 is secured to a sleeve journaled in bracket 156 and in turn the sleeve is keyed to a lever 157 operable by means of a cam 158. Lever 154 is keyed to a shaft 159 journaled in brackets 156 and 160 and keyed at its outer end to a lever 161 having a cam follower 162 controlled by cam 163. Both cams 158 and 163 are secured to a camshaft 164 driven from the main tufting machine and preferably crankshaft 142 through a jackshaft 165, sprocket 166, and chain 167. It will be understood that the twist imparting mechanism illustrated in FIGURE 17 varies the twist of the various yarn components which are fed through the eye of each of the needles. These may be in the form of plies of separate yarn ends which in effect become plies due to the twisting action of the pinions. It is, of course, possible to thread the needles in such a way that the yarns in alternate needles or any other selected needle are all controlled by the same series of pinions and the yarn in alternate or intermediate needles are controlled by pinions turning in the opposite direction. In any event, the superimposed twist in the yarns fed to the needles is controlled in accordance with the action of the pinions at a point just prior to being tufted into the fabric 146.

FIGURES 19 and 20 illustrate schematically a tufted fabric in which the three yarns 150, 151, and 152 have been twisted to provide variations in effect, for example, the portion illustrated at end 150 shows a relatively uniform twist throughout. Yarn end 151, however, shows a variation from a hard or tight twist at the area 153 to a lower twist in the area 154. Yarn end 150 likewise varies from a hard twist in area 155 to a low twist in area 156. These ends may cross over as shown in FIGURE 19 due to the operation of a waveline attachment or a shifting needle bar to variously enhance the effects achieved.

FIGURE 20 illustrates schematically the top of a tufted fabric in which three yarn ends having different characteristics, presumably different colors, are all threaded through the same needle and are caused to variably twist in the fabric whereas the appearance gives the impression that the same yarn end does not run straight through the fabric. With proper designing, it may be possible in a tufted fabric to eliminate the use of a waveline attachment or a shifting needle bar, thus creating the random effect so much desired. Furthermore, in both the tufting and weaving operations, it is often possible to eliminate one step of preparation due to the fact that the pinions 62 introduce sufficient intermediate twist to permit introduction of the yarns into the fabric.

It will thus be understood that we have provided a very important accessory for looms and other types of pile fabric producing equipment whereby a controllable twist is introduced into the pile yarns just prior to their being formed into the fabric. The invention as described may replace one or more of the conventional twisting operations heretofore employed in the production of carpet yarn. Also the invention has an effect upon the single twist of the various yarns and this is in accordance with simple harmonic motion as the fabric progresses through the loom or tufting machine.

Having thus described our invention, we claim:

1. The method of producing a pile fabric which comprises the steps of supplying twisted pile yarns to a pile forming station wherein the pile yarns are united with a backing material, imparting a twist to at least two of said twisted pile yarns between the yarn supply and the station during the feeding thereof to ply the twisted pile yarns into a single yarn end, and maintaining said twist in the formed yarn end until the yarns are anchored into the fabric.

2. The method of producing a pile fabric which comprises the steps of supplying twisted pile yarns to a pile forming station wherein the pile yarns are united with a backing material, imparting a twist to at least two of said twisted pile yarns between the yarn supply and the station during the feeding thereof to ply the twisted pile yarns into a single yarn end, maintaining said twist in the formed yarn end until the yarns are anchored into the fabric, and reversing the direction of the imparted twist.

3. The method of producing a pile fabric which comprises the steps of supplying twisted pile yarns to a pile forming station wherein the pile yarns are united with a backing material, imparting a twist to at least two of said twisted pile yarns between the yarn supply and the station during the feeding thereof to ply the twisted pile yarns into a single yarn end, maintaining said twist in the formed yarn end until the yarns are anchored into the fabric, and applying the twist in opposite directions to at least two alternate groups of formed yarn ends.

References Cited by the Examiner

UNITED STATES PATENTS

| | | | |
|---|---|---|---|
| 1,953,720 | 4/1934 | Nutter | 139—35 |
| 2,410,394 | 10/1946 | Savage | 139—35 |
| 2,696,181 | 12/1954 | Lacey | 112—266 |
| 2,896,671 | 7/1959 | Park et al. | 139—46 |
| 2,908,013 | 10/1959 | Keen et al. | 2—278 |
| 2,971,245 | 2/1961 | Feild et al. | 161—62 |
| 3,078,543 | 2/1963 | Bloch | 161—62 |
| 3,095,840 | 7/1963 | Ballard | 112—266 |
| 3,099,907 | 8/1963 | Masurel et al. | 139—1 X |

ROBERT R. MACKEY, *Acting Primary Examiner.*

RUSSELL C. MADER, JORDAN FRANKLIN, DONALD W. PARKER, *Examiners.*